United States Patent
Bolton et al.

[11] 4,054,931
[45] Oct. 18, 1977

[54] GAS FILTERING ARRANGEMENT FOR MAGNETIC DISK INFORMATION STORAGE APPARATUS

[75] Inventors: Ivor William Bolton; Ian Charles George, both of Winchester, England

[73] Assignee: International Business Machines Corporation, Armonk, N.Y.

[21] Appl. No.: 666,554

[22] Filed: Mar. 15, 1976

[30] Foreign Application Priority Data

Apr. 2, 1975 United Kingdom ............... 13544/75

[51] Int. Cl.² ............................................. G11B 23/04
[52] U.S. Cl. ..................................................... 360/97
[58] Field of Search ...................... 360/97, 98, 99, 100

[56] References Cited

U.S. PATENT DOCUMENTS

| | | | |
|---|---|---|---|
| 3,624,624 | 11/1971 | Johnson | 360/100 |
| 3,631,423 | 12/1971 | Groom | 360/97 |
| 3,710,357 | 1/1973 | Buslik | 360/97 |
| 3,731,291 | 5/1973 | Walsh | 360/98 |
| 3,849,800 | 11/1974 | Cuzner | 360/97 |

*Primary Examiner*—John H. Wolff
*Attorney, Agent, or Firm*—R. D. Moss; R. E. Cummins

[57] ABSTRACT

A gas filtering arrangement is described for a magnetic disk file consisting of a closed housing surrounding the magnetic disks. A bearing mounted in a wall of the housing carries a drive shaft upon which the disk (or disks) and a gas impeller are mounted. The impeller pumps gas through a main filter, located within the housing, to clean the gas. The air flow due to the impeller and the disk is arranged to maintain a positive air pressure adjacent the bearing to prevent gas entering the housing through the bearing. A breather filter within the housing connected to the exterior of the housing by a breather aperture is arranged so that during operation a negative pressure is applied to the breather filter to prevent gas leaving the housing through the breather filter.

8 Claims, 5 Drawing Figures

GAS FILTERING ARRANGEMENT FOR MAGNETIC DISK INFORMATION STORAGE APPARATUS

BACKGROUND OF THE INVENTION

1. Field of the Invention

This invention relates to a novel and improved magnetic disk information storage apparatus.

2. Description of the Prior Art

Magnetic disk files have been used for many years as bulk memories in data processing equipment. These magnetic disk files consist of a housing in which one or more flat disks are rotated at high speed. Magnetic recording material is deposited on one or both faces of each disk. Recording heads are arranged adjacent each recording face of the disks to read and write data upon the recording material.

Recording heads have been developed which float upon a thin film of air generated by a rapidly rotating disk. These recording heads have become known as flying heads. Flying heads are known which are always out of contact with an adjacent disk surface. However, in low cost magnetic disk files it is desirable that when the disks are not rotating each flying head should rest upon a portion of its adjacent disk surface which is not used for data recording.

With this type of flying head operation, the flying head is touching the disk surface below predetermined disk rotation speed, and each time the flying head takes off from or lands upon the disk surface particulate matter might be generated. As the flying heads float 50 micor-centimeters or less, above the disk surface, this particulate matter could interfere with floating head and thus must be removed from the disk file housing.

When the magnetic disks are rotated by a shaft which passes through the housing via a bearing, this bearing is a potential source of particulate matter and contamination which could interfere with flying head operation unless entry of this particulate matter and contamination is prevented.

In U.S. Pat. No. 3,710,357 (Ser. No. 51,867) to W. S. Buslik, there is described a magnetic disk storage file within a sealed enclosure. A rotatable hub is mounted on a drive spindle and supports an annular magnetic disk, an annular filter upstanding from the hub and a fin structure supported by the filter. Rotation of the spindle and hub also rotates the filter and fin structure and causes circulation of air for cooling and cleaning purposes around the disk annulus and through the filter by way of apertures in the hub. In such apparatus, a negative pressure region is created in the vicinity of the hub which could operate to draw contaminants through the spindle bearing. U.S. Pat. No. 3,489,800 (Ser. No. 231,320) to Cuzner also describes a magnetic disk apparatus having a sealed disk module and a filtering arrangement therefor. Rotation of a disk mounted on a hub and spindle assembly causes motion of air towards the disk periphery as in the Buslik U.S. Pat. No. 3,710,357 referred to above. The module is formed with a lower chamber, communication with which is by way of a main filter located beyond the disk periphery and a return port through which circulated air may return to the hub region. As with the Buslik arrangement, a negative pressure region is created in the vicinity of the hub but this is relieved by an externally mounted breather filter also located near the hub. The breather filter ensures that the pressure in the hub region is maintained at or near external atmospheric pressure. The possibility of contaminants entering the module via the spindle bearing is thus reduced, but not prevented.

SUMMARY OF THE INVENTION

Accordingly, it is an object of the present invention to provide a magnetic disk information storage apparatus having a new and improved gas circulation and filtration system.

It is also an object of the invention to provide means for creating a positive gas pressure region, in operation, near the spindle bearings of a magnetic disk apparatus to substantially prevent entry of contaminants through the bearings.

The above and other objects and advantages of the invention are achieved by mounting at least one magnetic disk for rotation on a spindle/hub assembly in a sealed file housing. The spindle/hub assembly is supported in cantilever fashion, for rotation, by bearings located in a bearing housing formed in one wall of the file housing. As well as the magnetic disk, the spindle/hub assembly supports an impeller at the end remote from the bearings. Face to face with the impeller is a main filter through which air is drawn as the impeller rotates with the hub/spindle assembly. The pressure distribution created by rotation of the hub/spindle assembly, disks and impeller results in an above atmospheric pressure region around the bearings and near the seals of the housing. Thus, contaminants from the bearing tend to be forced out of rather than into the housing. Also provided is a breather filter which communicates with the exterior of the housing to provide pressure relief so that the internal pressure of the housing is always referred to the external atmospheric pressure. The impeller is so disposed relative to the disk or disks that a negative pressure region tends to be created remote from the bearing. By locating the breather filter in this region, the pressure therein is maintained at or near atmospheric and the pressure near the bearings is thus maintained relatively higher. Entry of contaminants by way of the bearings is thus substantially prevented by the tendency of the high pressure air to flow out through the bearings.

BRIEF DESCRIPTION OF THE DRAWINGS

The invention will be further explained, by way of example, with reference to the accompanying drawings in which:

Referring now to FIG. 1 which illustrates diagramatically a clean air system for a magnetic disk file 1 using flying heads which rest on the disk surface when the disks are not rotating. Disk file 1 is surrounded by a housing consisting of a base plate 2 and a cover 3, with an air tight seal 4 between base plate 2 and cover 3.

Figure 1:
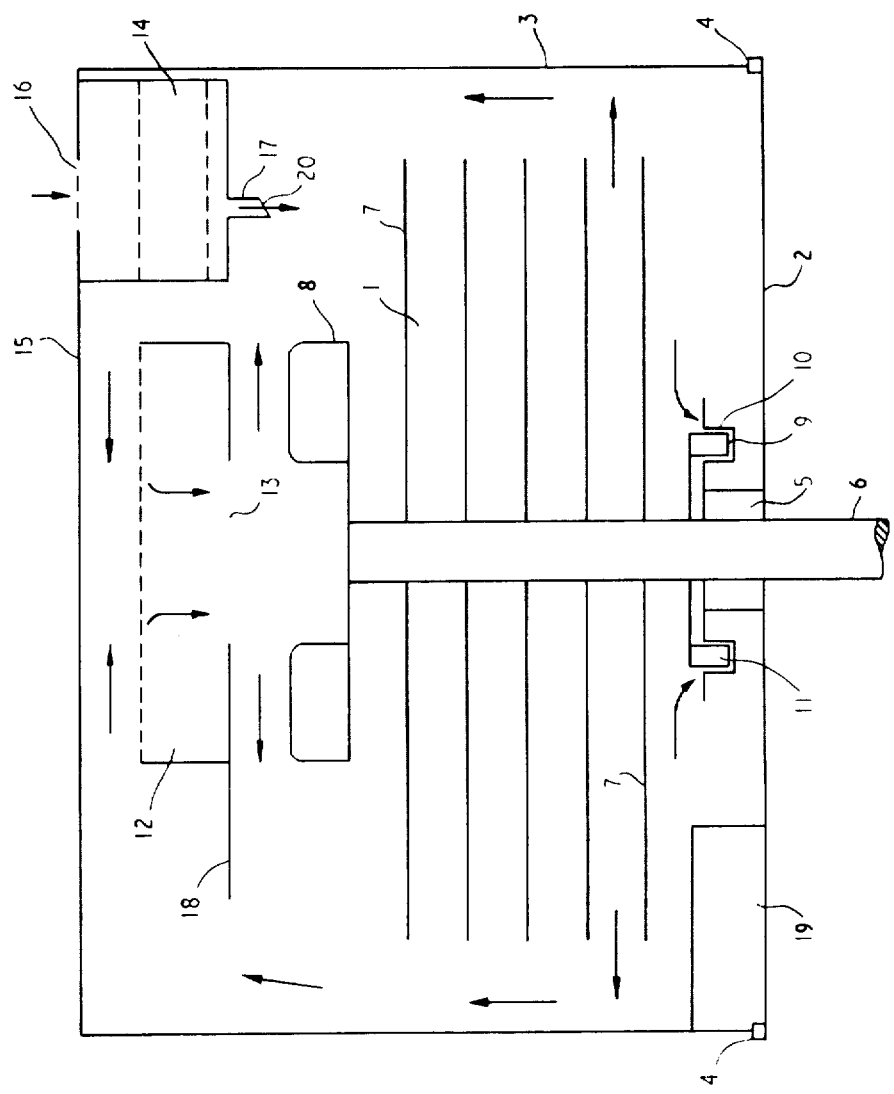
FIG. 1 is a schematic cross sectional view of a magnetic disk information storage apparatus according to the invention and illustrating the gas flow therein.

A bearing 5 is mounted on the base plate to support a shaft 6 which is rotated during operation. Rigidly fixed to shaft 6 adjacent to bearing 5 are a number of magnetic disks 7. An air impeller 8 is connected to the end of shaft 6 remote from bearing 5. An air labyrinth 9 is associated with bearing 5 by providing a narrow air gap between circular slot 10 in a member fixed to base plate 2 and annular projection 11 on a member fixed to shaft 6.

Mounted immediately above air impeller 8 is a main filter 12 having a circular orifice 13 centrally positioned with respect to shaft 6. A breather filter 14 is mounted at the side of main filter 12 on the upper wall 15. A number of breather apertures 16 through wall 15 expose the upper surface of breather filter to air from outside covers 3, and a breather pipe 17 exposes the lower surface of filter 14 to the interior of cover 3.

To control the air circulation within the housing during operation when magnetic disks 7 are rotated by shaft 6, experience has shown that one or more air baffles may be required to provide the required air pressure distribution described in the following paragraphs. The position and size of these air baffles is determined experimentally by air pressure measurements within the housing. Two such baffles are shown in FIG. 1. Firstly, a horizontal plate 18 is attached to the lower surface of main filter 12 and secondly a vertical plate 19 is attached to base plate 2. Horizontal plate 18 may be of circular outline and be attached to both main filter 12 and breather filter 14.

During operation when shaft 6 rotates, the air circulation within the housing is due to the rotation of air impeller 8 and the rotation of magnetic disks 7. This air circulation due to the fan action of impeller 8 and the pumping action of disks is not fully understood but important directions of air flow are indicated in FIG. 1 by arrows.

During operations, air impeller 8 continually sucks air through circular orifice 13 of main filter 12. This air is subsequently forced horizontally outwards by impeller 8 and mostly follows an upward path to the upper surface of main filter 12. Thus impeller 8 sets up a main flow of air continuously circulating through filter 12 which will remove particulate matter from this main air flow.

There is also an auxiliary air flow due to the pumping action of rotating disks 7 which expels air laterally from the disks and mixes with the main air flow. This auxiliary flow scavenges any particulate matter which may be generated by the flying head transducers when landing or taking off from the disk surfaces, and transfers this particulate matter to the main air flow which is continuously cleared by main filter 12.

The air circulation within the housing is arranged so that during operation an air pressure, positive with respect to atmospheric pressure outside the housing, is generated within the housing adjacent to bearing 5. This positive pressure prevents air entering the housing through the bearing and thus prevents any particulate matter or contamination generated by the bearing from being introduced into the housing.

The volume of air escaping through bearing 5 due to the positive pressure applied is minimised by air labyrinth 9 which provides an air path in series with the air path through the bearing 5. The resistance of the air path through the labyrinth 9 is made high so that the decreasing resistance of the air path through the bearing 5 due to wear during the life of the bearing has little effect upon air flow through the bearing 5.

The breather filter 12 is located in the housing so that during operation an air pressure, negative with respect to atmospheric pressure outside the housing, is generated within the housing adjacent to breather tube 17. This negative pressure causes air to flow into the housing through breather filter 14 and breather tube 17 to replace any air leaving the housing through bearing 5.

Breather tube 17 may have a shaped end portion 20 projecting into the housing, so that rotation of breather tube 17 may assist in obtaining the required negative pressure as a result of air flow past shaped end portion 20.

The resistance to air flow along the path through labyrinth 10 and bearing 5 is made much greater (more than 50 times greater) than the resistance to air flow along the path through breather apertures 16, breather filter 14 and breather tube 17. This is to ensure that when operation ceases whilst the interior of the housing is above ambient temperature, the air flow into the housing as its interior cools down is almost entirely through breather filter 14, and a negligible air flow occurs through bearing 5. Also during periods of inoperation temperature changes may cause air flow into the housing which will again occur almost entirely through breather filter 14.

The air circulation is arranged so that under all operating conditions there is a small positive pressure generated within the housing adjacent to air seal 4. This insures that if a slight leak should occur due to a faulty air seal 4, air flow will occur from the housing, and so particulate matter cannot be introduced into the housing through a faulty air seal 4.

When operation starts, there may be a period during which there is a flow of air through breather filter 16 to the exterior of the housing, but during this period a positive pressure is generated adjacent bearing 5 so that no air flow into the housing occurs through bearing 5.

During the manufacture of the magnetic disk file the cover 3 is sealed to the base plate 2 under clean room conditions. Thus initially very little particulate matter is included within the housing. The size of main filter 12 should be sufficient to filter out any particulate matter generated within the housing during the life of the disk file. Also, the flow through breather filter 14 during operation should be selected to be of low volume so that breather filter 14 will remain efficient throughout the life of the disk file.

In the foregoing description referring to FIG. 1 it is assumed that the disk file is located in a normal air atmosphere. However, the disk file may be located in any gaseous atmosphere such as nitrogen which is not hostile to the materials used in constructing the disk file.

Figure 2:
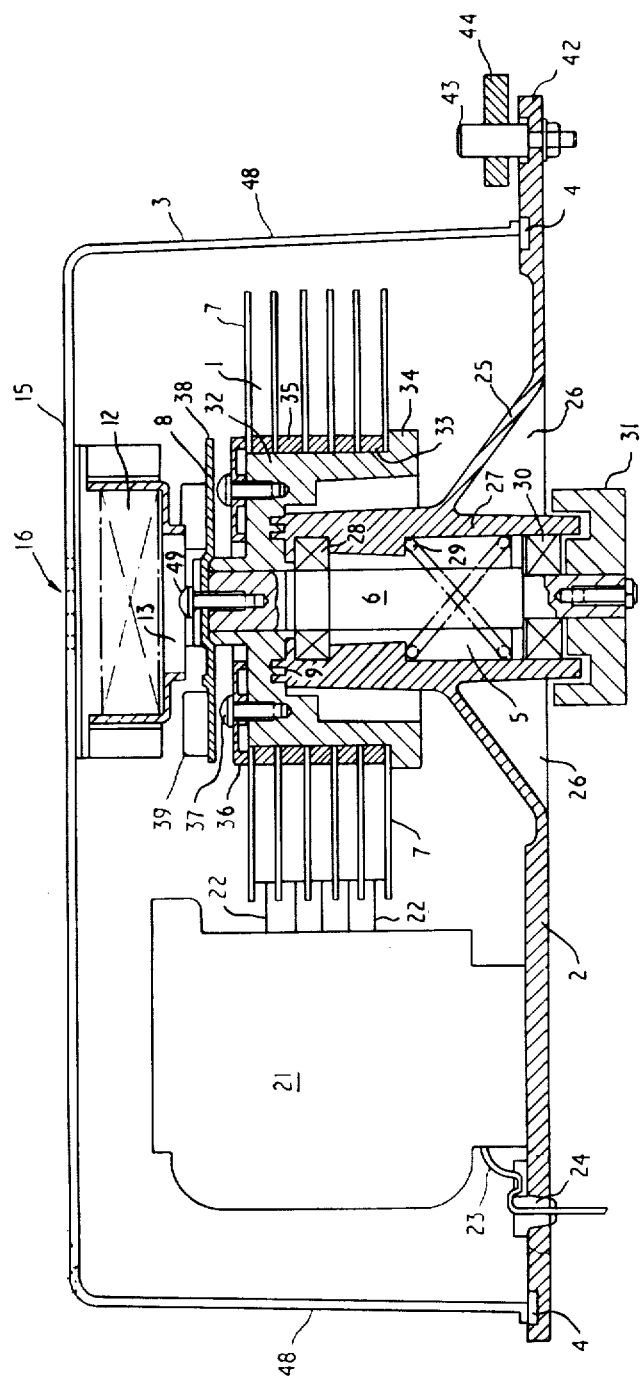
FIG. 2 is a side sectional view of a magnetic disk information storage apparatus according to the invention, taken along the lines AA of FIG. 3.
Figure 3:
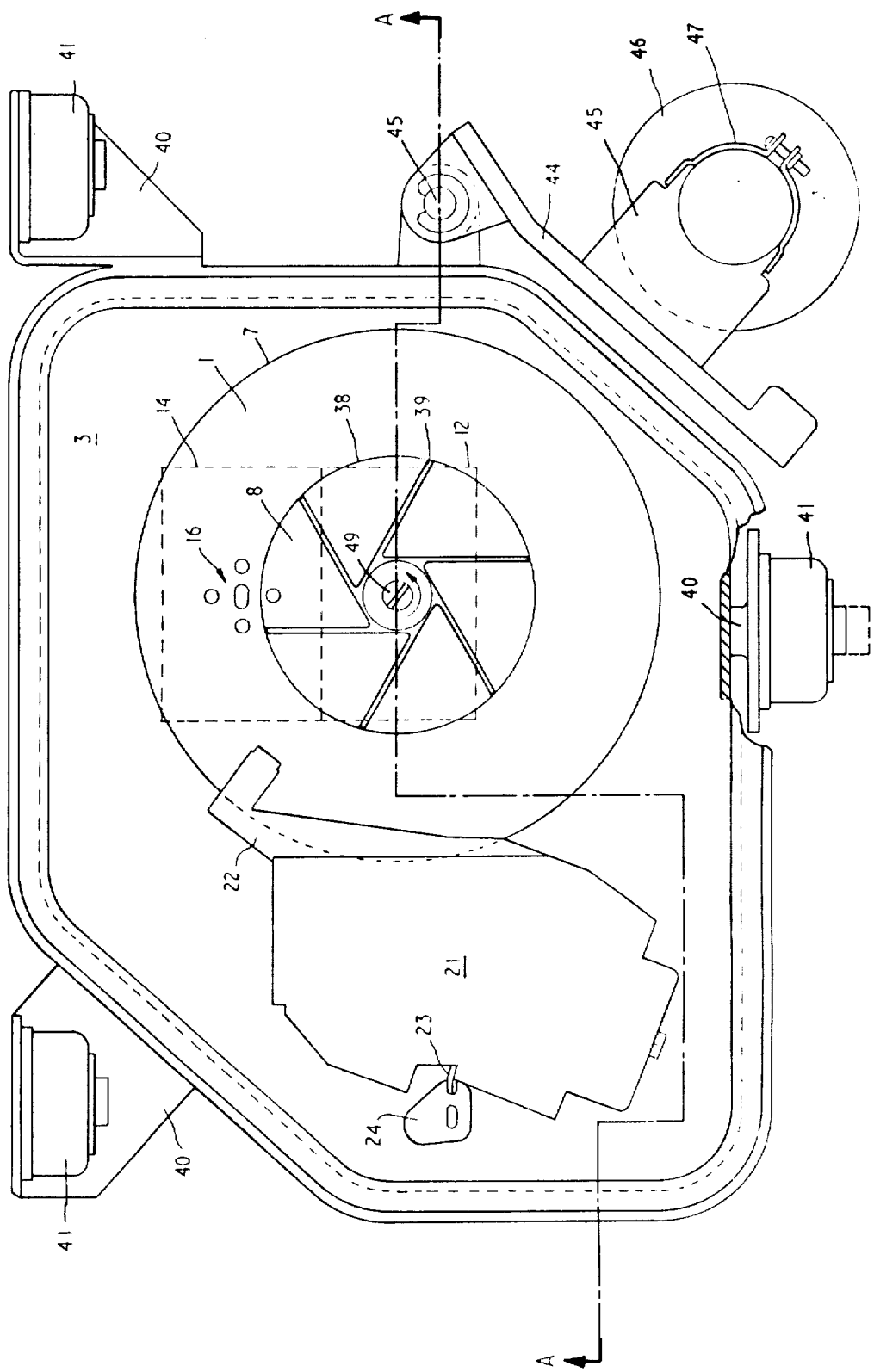
FIG. 3 is a plan, partly schematic, view of the magnetic disk apparatus of FIG. 2.

Referring now to FIGS. 2 and 3 which are views of a magnetic disk file embodying the present invention, the numerals designating components in FIG. 1 will be used to designate the same components in FIGS. 2 and 3, when possible.

Disk file 1 is enclosed in a housing consisting of a base plate 2 and a cover 3 with an air tight seal 4 between base plate 2 and cover 3. Cover 3 is pressed against seal 4 by a number of clips (not shown) arranged around the periphery of base plate 2. Although FIG. 2 suggests that shaft 6 is vertical, the magnetic disk file will normally be mounted with shaft 6 horizontal.

Cover 3 is shaped to enclose disk file 1 and an electromagnetic actuator 21 for positioning angularly movable arms 22 carrying flying head transducers to access the magnetic disks. Electrical connections 23 to actuator 21 and the flying head transducers are taken through base plate 2 via cable clamp and bush 24.

Electromagnetic actuator 21 and movable arms 22 are shown schematically as they form no part of the invention and will not be described in this specification. A suitable actuator and accessing mechanism is described in U.S. Pat. No. 3,849,800, identified above.

Metallic base plate 2 is strengthened by inverted cone-shaped member 25 and radial ribs 26 to support a vertical cylindrical bearing housing 27. Bearing housing 27 has an internal bore machined to accept ball race 28 from above and spring 29 and ball race 30 from below. Spring 29 reduces any vertical play in the ball races. Together ball races 28, 30 and spring 29 constitute bearing 5.

Ball races 28 and 30 rotatably support shaft 6. A coned pulley 31 is fixed to the lower end of shaft 6 by a screw. An upper portion of shaft 6 is splined for the attachment of hub 32, which has a cylindrical external wall 33 with a flange 34. Six magnetic disks 7 with metal spacers between, are stacked along wall 33 and supported by flange 34. The disks 7 are held in position by an annular clamp 36 with screws 37.

An air impeller 8 consisting of a horizontal circular plate 38 with six vertical, radial blades 39 is fixed to the upper end of shaft 6 by screw 49. Air impeller 8 is rotated anticlockwise as shown in FIG. 3. An air labyrinth 9 in series with the air path through the bearing is formed by a small clearance between cylindrical projections on the upper surface of bearing housing 27 and circular slots on the inner surface of hub 32.

Integral with base plate 2 are three mounting brackets 40, which support conventional anti-vibrations bushes 41 (see FIG. 3), to permit the base plate to be bolted to an appropriate rigid support member. Also integral with base plate 2 is bracket 42 with pivot pin 43 bolted thereto. A swinging arm 44 having motor bracket 45 attached is pivoted on pivot pin 43. Electric motor 46 is secured to motor bracket 45 by a clamp 47. A drive pulley (not shown) on the motor shaft drives pulley 31 via a conventional belt to rotate shaft 6 and magnetic disks 7. The tension in the belt is adjusted by means of swinging arm 44.

Cover 3 is fabricated from transparent polycarborate plastics material and is dome shaped with a flat upper wall 15 to enclose the magnetic disks 7 and electromagnetic actuator 21. The side walls 48 are not exactly vertical but taper inwards at a small angle. In plan view (FIG. 3) side walls 48 are in the shape of a distorted rectangle with rounded corners. When cover 3 is sealed to base plate 2, air can enter or leave the enclosed housing through breather apertures 16 in upper wall 15. Mounted on upper wall 15 are two filters, main filter 12 located centrally above shaft 6, and to one side breather filter 14 located centrally below breather apertures 16.

Figure 4:
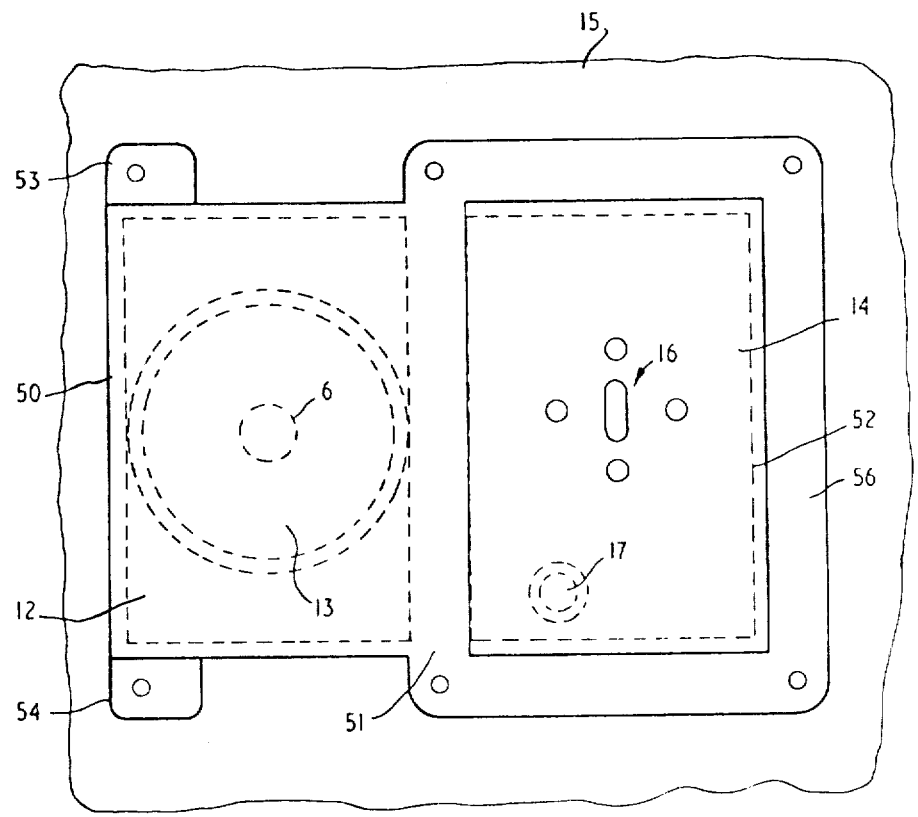
FIG. 4 is an enlarged view showing details of the filter units illustrated only schematically in FIG. 3
Figure 5:
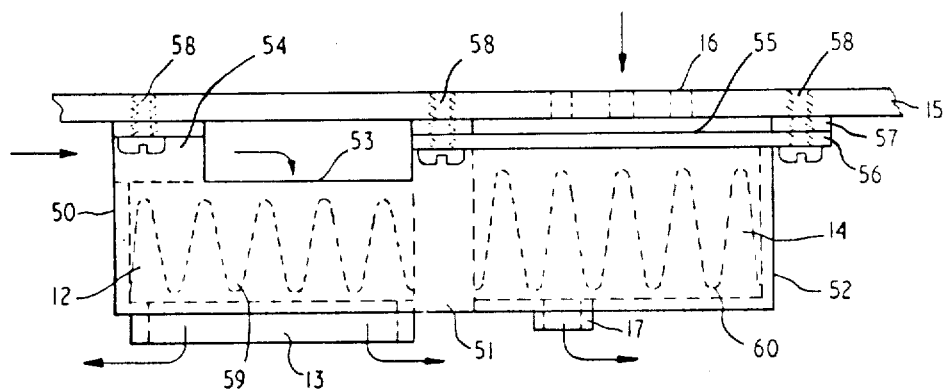
FIG. 5 is a side view of the filter units shown in FIG. 4.

FIGS. 4 and 5 show an enlarged plan view (rotated through 90° with respect to FIG. 3) and an enlarged side view respectively of the combined filter units.

The filter units are constructed from a transparent plastic material to enable visual inspection of the filters through the transparent cover 3. The filter units consist of a rectangular box 50, for main filter 12 sharing a common wall 51 with a rectangular box 52 for breather filter 14.

Rectangular box 50 has an open upper side 53 which is spaced from upper cover wall 15 by a pair of legs 54, and a circular orifice 13 in its lower side. This enables air to circulate through main filter 12 when air impeller 8 on shaft 6 rotates. The diameter of orifice 13 is slightly less than the diametric space between impeller blades 38, the upper edges of which are arranged to be approximately level with the lower edge of orifice 13 to provide efficient air circulation through main filter 12.

Rectangular box 52 has an open upper side 55 and a small circular orifice in alignment with integral breather pipe 17 on its lower side.

In some applications, it has been found that breather pipe 17 is not required and may be replaced by an aperture in the lower side of rectangular box 52. Upper side 55 includes flange 56 which including wall 51 forms a flat surface around box 52. A sealing washer 57 of identical shape to flange 56 and upper surfaces of wall 51 enables an air-tight joint to be made with cover wall 15 when the filter units are screwed to cover wall 15 by screws 58. Thus air can enter or leave the magnetic disk housing via apertures 16 and breather filter 14. The actual filter elements 59 and 60 of main filter 12 and breather filter 14 respectively are each formed of glass fiber paper strips assembled in zig-zag fashion as shown in FIG. 5. Main filter 12 and breather filter 14 are what are termed absolute filters and remove all particulate matter. The direction of air flow during operation through main filter 12 and breather filter 14 is indicated by arrows in FIG. 5.

The air circulation in the housing shown in FIGS. 2 and 3 is substantially as described in detail for FIG. 1 and will not be repeated here. The presence of electromagnetic actuator 21 within cover 3 causes localized turbulent air flow but the general direction of air flow remains unchanged.

The effect of base plate 2 and cover 3 is checked by recording the air flow directions indicated by smoke introduced within the housing and by pressure measurements whilst shaft 6 is rotated. As a result of such tests, it was found that the housing shown in FIGS. 2 and 3 required no additional baffles to obtain the required air circulation and pressure distribution.

Measurements indicate that the rate of air flow through main filter 12 is approximately 30 liters/minute under operating conditions. When the housing is filled with smoke, this rate of air flow enables main filter 12 to completely clear the smoke and establish clean air within the housing in less than 2 minutes. It is estimated that air within the housing passes through main filter 12 seven times each minute.

In contrast, the rate of air flow under operating conditions into the housing through breather filter 14 to replace air flow out of the housing through bearing 5 has a relatively low value of approximately 100 cc per minute. Pressure measurements under operating conditions with at least the lowest magnetic disk 7 in position on shaft 6 have shown that under worst case conditions the negative pressure adjacent breather tube 17 was 0.03 mm WG with respect to atmospheric pressure. Under similar condition the positive pressure adjacent air labyrinth 9 was measured as 0.15 mm WG with respect to atmospheric pressure. The negative pressure adjacent breather tube 17 ensures a continuous inflow of air through breather filter 14 to replace air flowing out through bearing 5 due to the positive pressure adjacent air labyrinth 9.

Pressure measurements under similar worst case operating conditions have shown that the positive pressure generated adjacent air seal 4 is approximately 5 mm WG. This positive pressure ensures that during operation, air will leave the housing through any slight leaks between air seal 4, base member 2 and cover 3.

The resistance to air flow through the serial path of breather aperture 16, breather filter 14 and breather pipe 17 is approximately 0.25 mm WG/liter/minute. This is low compared to the resistance to air flow through the serial path of air labyrinth 9 and bearing 5 which has the value of approximately 25 mm WG/liter/minute. Thus when the disk file is not in operation and the interior of the disk file housing is cooling down the air flow into the housing through breather filter 14 will be approximately 100 times greater than the air flow through bearing 5. Tests were made upon the efficiency of the disk file housing in a dusty atmosphere surrounding the housing having a high level of $10^6$ particles per liter. Under operating conditions a count of particulate matter within the housing gave the result of 2 particles in 10 minutes having a size exceeding 3 micrometers.

In the clean air system described so far it has been assumed that the air surrounding the disk file housing is contaminated only by particulate matter. This particulate matter is filtered by breather 14 when entering the housing. However, the disk file may be required to operate in an atmosphere including gaseous contaminants whose presence inside the housing could cause deterioration of operating characteristics. For operation under such hostile conditions, breather filter 14 would include an additional filter element to remove the gaseous contaminants in series with the filter element 60 of glass fibre paper shown in FIG. 5. For example, a layer of activated charcoal would be used. This could result in increased dimensions of rectangular box 52 and redesign of breather aperture 16 and breather tube 17 to give the required air flow through breather filter 14. The additional filter element must have sufficient capacity to remove the gaseous contaminants during the total period of operation in the hostile conditions.

What we claim is:

1. Magnetic disk information storage apparatus of the kind employing heads flying in a gaseous medium adjacent a magnetic disk and comprising:
    at least one magnetic disk;
    at least one magnetic head for transducing signals representative of information onto or from said disk;
    a housing substantially enclosing and sealing said at least one disk and said at least one head, and comprising first and second end walls spaced axially from said disk on opposite sides thereof and a side wall surrounding said disk;
    a spindle supporting and being rigidly connected to said at least one disk and having one free end within said housing and a second end external to said housing;
    a bearing located in said first wall of said housing and supporting said spindle for rotation about an axis thereof, said bearing constituting a path for gas leakage between the interior and exterior of said housing;
    an impeller mounted on said free end of said spindle for rotation therewith;
    a main filter within said housing for filtering said gaseous medium;
    means for supporting said main filter in a position spaced from and between said impeller and said second wall of said housing;
    and means for rotating said spindle thereby developing a pressure distribution within said housing with which is characterized by a region of relatively lower pressure in the vicinity of said impeller and a region of relatively higher pressure in the vicinity of said bearing;
    said apparatus further comprising
    breather filter means having at least one external gas port to the exterior of said housing and having an internal gas port to the interior of said housing, said internal gas port being located in said relatively low pressure region whereby the pressure in said region is substantially equalized with the ambient pressure exterior to said housing and the pressure in the vicinity of said bearing is above ambient pressure so as to reduce the likelihood of contaminants entering the storage apparatus.

2. Apparatus according to claim 1 wherein said breather filter means comprise a filter mounted on the inside of said second wall of said housing and said external gas port comprises at least one passage through said second housing wall communicating between said filter and the exterior of said housing.

3. Apparatus according to claim 3 wherein said main filter and said filter of said breather filter means constitute a single unit located on the interior of said second wall of said housing means.

4. Apparatus according to claim 3 wherein said breather filter means include a breather tube having an open end constituting said internal gas port.

5. Apparatus according to claim 1 further comprising a gas labyrinth in series with said gas leakage path associated with said bearing.

6. Apparatus according to claim 5 wherein said spindle comprises a shaft and a hub assembly, said labyrinth being formed between said hub assembly and an opposed portion of said first wall of said housing.

7. Apparatus according to claim 5 in which the resistance to gas flow of said breather filter means is considerably lower than the series resistance of said bearing and labyrinth.

8. Apparatus according to claim 1 wherein said impeller comprises a flat circular plate fixed to said spindle and a plurality of blades fixed to and upstanding from said plate.

* * * * *